(12) United States Patent
Ferguson

(10) Patent No.: US 6,523,427 B1
(45) Date of Patent: Feb. 25, 2003

(54) TEMPERATURE SENSING PROBE ASSEMBLY FOR FLUID METER

(75) Inventor: Walter J. Ferguson, Waterbury, CT (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/704,119

(22) Filed: Nov. 1, 2000

(51) Int. Cl.⁷ .............................................. G01D 21/00
(52) U.S. Cl. ..................................................... 73/866.5
(58) Field of Search ........................ 73/866.5; 166/67, 166/69, 225

(56) References Cited

U.S. PATENT DOCUMENTS

| | | | | |
|---|---|---|---|---|
| 3,581,566 A | * | 6/1971 | Goff | 73/233 |
| 5,322,119 A | * | 6/1994 | Kadwell et al. | 166/67 |
| 5,829,148 A | * | 11/1998 | Eaton | 33/1 PT |
| 5,944,179 A | * | 8/1999 | Walker | 206/305 |
| 5,973,267 A | * | 10/1999 | Huang | 174/102 |
| 6,051,293 A | * | 4/2000 | Weilandt | 428/35.2 |

* cited by examiner

Primary Examiner—Hezron Williams
Assistant Examiner—Jewel V. Thompson
(74) Attorney, Agent, or Firm—Jenkens & Gilchrist, P.C.

(57) ABSTRACT

A temperature sensing probe assembly for correcting fluid volume readout of a fluid meter in response to fluid temperature in relation to a standard measurement of temperature for the fluid. A temperature sensitive bimetallic probe is adapted to be immersed in the meter fluid and is enclosed in a tubular metal sheath for protecting the probe against potential injury when handled. Perforations in the sheath enable direct contact between the fluid and the probe.

14 Claims, 4 Drawing Sheets

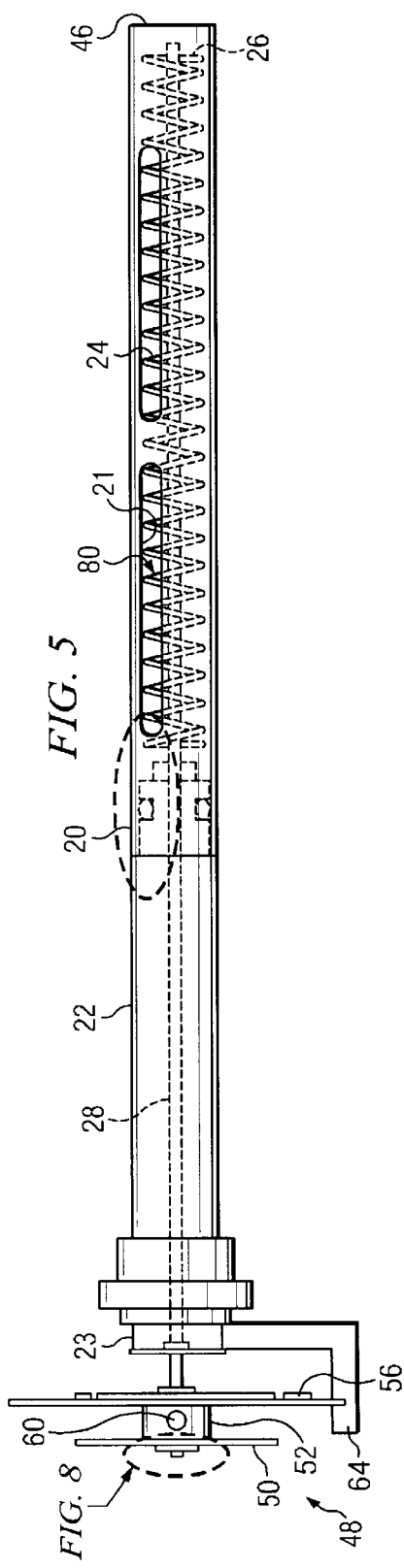
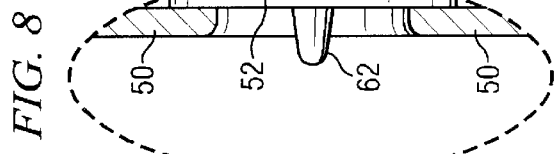
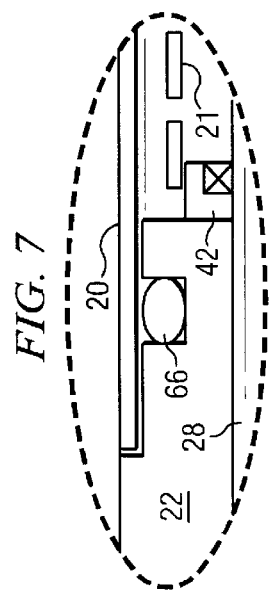
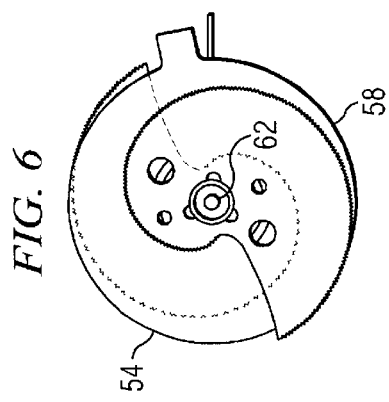

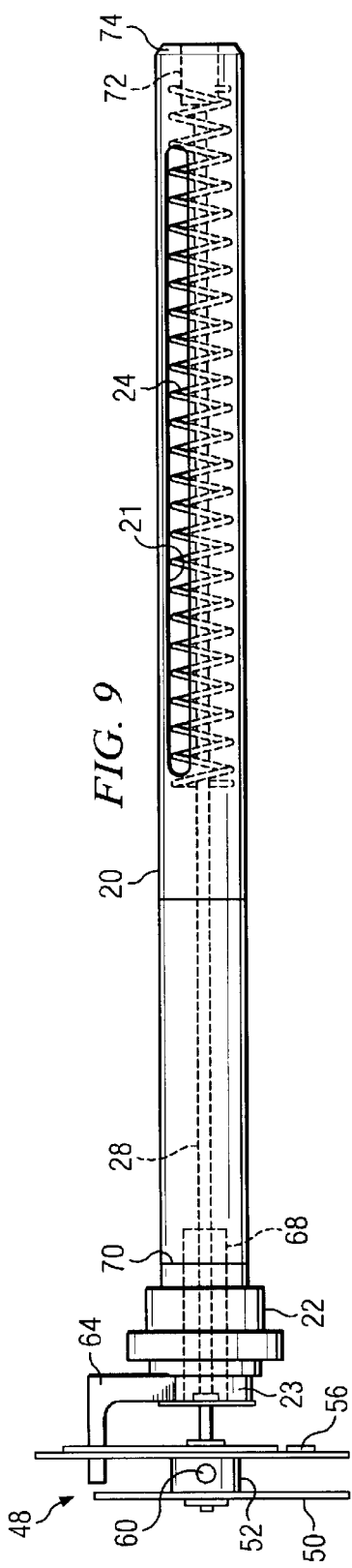
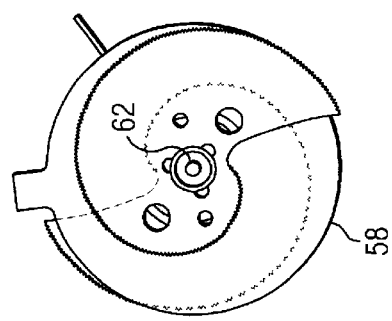
FIG. 9
FIG. 10

TEMPERATURE SENSING PROBE ASSEMBLY FOR FLUID METER

FIELD OF THE INVENTION

The field of art to which the invention relates comprises meters for measurement of fluid flow volume and having a sensing probe for effecting temperature correction of fluid volume at temperatures deviating from a standard temperature for the metered fluid.

BACKGROUND OF THE INVENTION

In fluid meters of the type commonly utilized for the volumetric measurement of gaseous fluids, such as gas meters, density of the gas and hence its heating value per unit of volume varies with changes of gas temperature. Consequently, the volume of gas passing through the meter, as recorded on an indicator driven by the meter, does not actually indicate what the volume would measure at a standard temperature used for computing the cost of gas consumed. Variations in gas density due to temperature changes thus result in under-registration of the meter at low temperatures and over-registration at high temperatures. It is therefore necessary, particularly in the case of a large gas-using installation to provide means to compensate for the effect of temperature variation.

BACKGROUND OF THE PRIOR ART

A mechanism for temperature correction of metered fluid is disclosed for example in U.S. Pat. No. 3,581,566 incorporated herein by reference. Disclosed therein is a mechanical compensating device which automatically compensates for temperature deviations via a volume correction mechanism that controls the drive of a compensated register. By compensating in this manner, the volumetric displacement of the meter is automatically corrected for variations in gas temperature from a standard based temperature so as to establish an accurate measurement for the consumer.

Such mechanisms as disclosed in the aforementioned '566 patent includes an elongated temperature probe of a wound bimetallic construction. The probe is emerged in the fluid flow and senses fluid temperature passing through the meter. In response to temperature changes, the probe serves to mechanically vary the counter index for correcting the volume readout to a predetermined standard or base temperature.

The probe, in this arrangement, is supported within the meter extending cantilevered into the flow path of the passing fluid. At such time as the probe needs to be serviced or replaced, it is customary to withdraw the probe from its meter support and service or replace it as required. Yet because the probe, is of a wound elongated fragile construction and cantilevered over a substantial portion of its length, handling can prove difficult to avoid injury during repair or replacement that could impair its operational accuracy. At the same time, the distal end of the cantilevered probe being unsupported has a tendency to droop whereby a rubbing contact can be incurred that likewise can adversely affect its operational accuracy.

Despite recognition of the foregoing, a ready solution for safeguarding the probe during repair or replacement has not heretofore been known.

OBJECTS OF THE INVENTION

It is therefore an object of the invention to provide apparatus for protecting the probe unit of temperature correction apparatus for a fluid meter against injury when handled.

It is a further object of the invention to utilize a structure that largely encloses and supports the probe against injury at least when serviced, manufactured, shipment, assembly, testing, retrofit, etc.

It is a still further object of the invention to effect the previous objects with a structure that is substantially uncostly to fabricate and relatively easy to assemble about the probe.

SUMMARY OF THE INVENTION

The invention relates to a protective article for a corrective temperature probe of a fluid flow meter. More specifically, the invention relates to a novel construction of such an article that can protect the fragile probe against injury during handling of the probe in situations that could otherwise result in damage producing operational inaccuracies for effecting temperature correction within the meter.

The foregoing is achieved in accordance with the invention utilizing a tubular metal sheath closely surrounding the injury prone probe. The sheath is preferably of a weldable metal composition, such as stainless steel, that closely surrounds the probe and is secured at its ends within the meter. The sheath is internally sized to permit arcuate displacement of the bimetallic sensing elements in response to temperature changes to which is exposed along its length. Preferably, the sheath includes a plurality of open slots through which a cross flow of fluid within the meter can contact the sensing element for permitting temperature changes to be encountered. When connected as to an operative reset mechanism of the meter, correction reset occurs continuously on an ongoing basis. Yet by virtue of the surrounding sheath, handling injuries such as has occurred in the past is eliminated so as to benefit from a substantially increased life expectancy and continuing accuracy of the probe unit.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 5 is a first side view embodiment of a sheath installation utilizing the sheath of FIG. 4:

FIG. 6 is an end view of the apparatus embodiment of FIG. 5;

FIG. 7 is a fragmentary and enlarged sectional view as contained in the encircled portion 7 of FIG. 5;

FIG. 8 is an enlarged partially broken away fragmentary view of encircled portion 8 of FIG. 5;

FIG. 9 is a second side view embodiment of a sheath installation utilizing the sheath of FIG. 4; and FIG. 10 is an end view of the apparatus embodiment of FIG. 9.

DESCRIPTION OF THE PREFERRED EMBODIMENT

Figure 1:
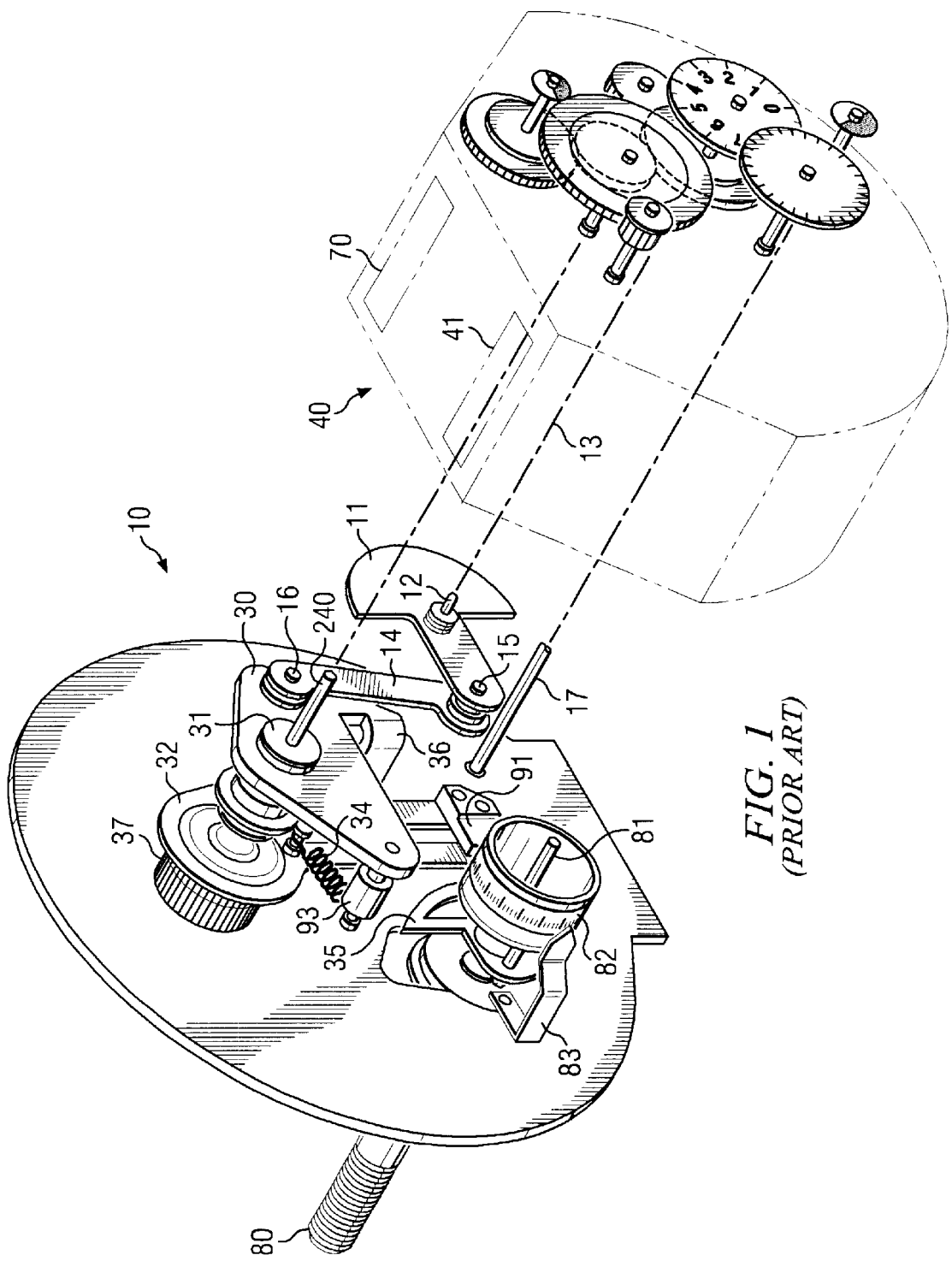
FIG. 1 is a fragmentary pictorial view of a prior art compensation device as disclosed in U.S. Pat. No. 3,581,566.

In the description which follows, like parts are marked throughout the specification and drawings with the same reference numerals respectively. The drawing figures are not necessarily to scale and in certain views, parts may have been exaggerated for purposes of clarity.

Figure 2:
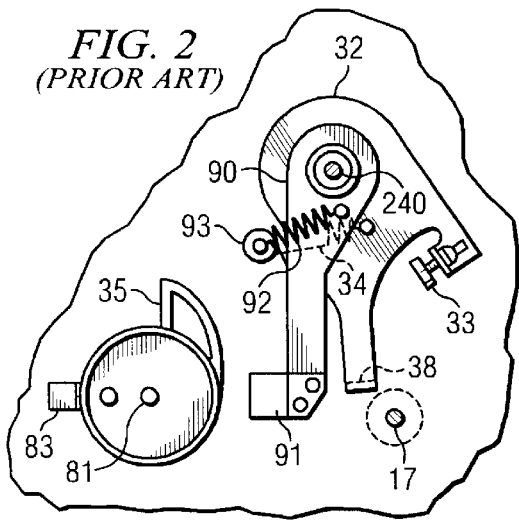
FIG. 2 is a diagrammatic cutaway of the braking and driven arm assemblies of the prior art unit of FIG. 1.
Figure 3:
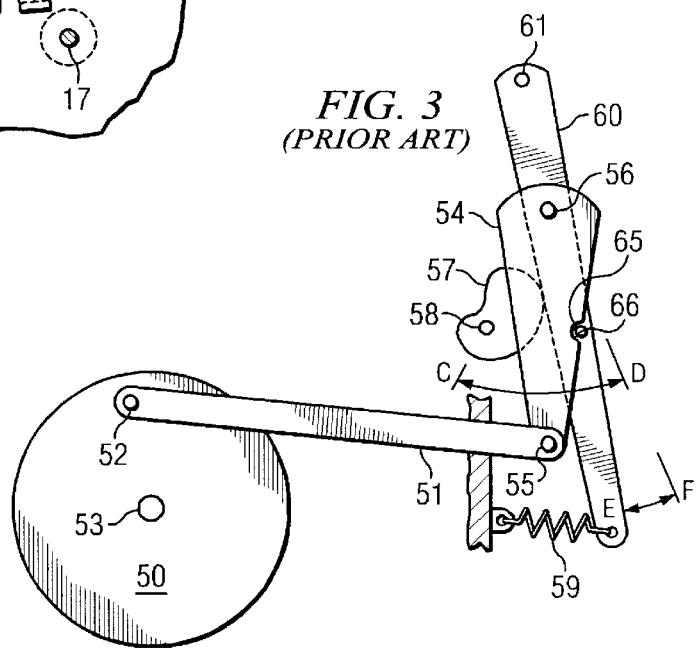
FIG. 3 is a diagrammatic representation of the prior art device of FIG. 1.
Figure 4:
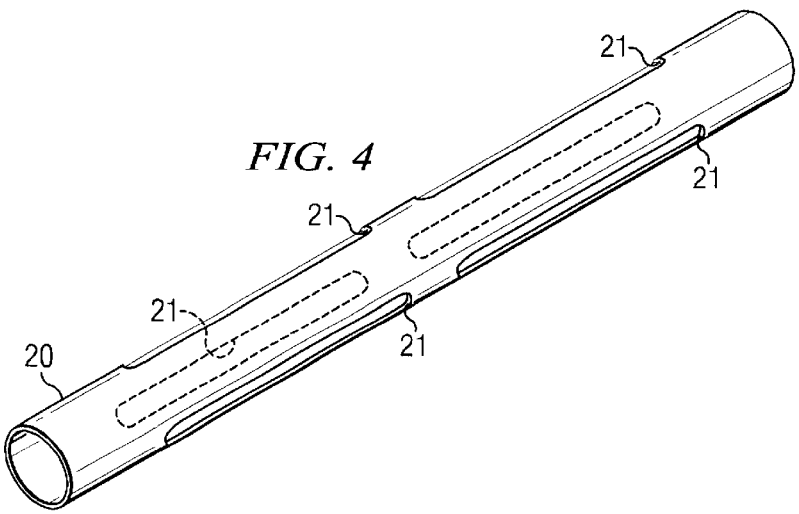
FIG. 4 is an isometric view of the probe protector sheath in accordance with the invention hereof.

Referring now to FIGS. 1–3 of the drawings, there is illustrated a commercially available temperature correction device, as disclosed for example in U.S. Pat. No. 3,581,566. As therein disclosed, the correction device is designated 10 and is adapted to be self-contained in a conventional fluid meter of the fixed or constant displacement type. Probe 80 provides the sensing of fluid temperature while device 10 includes a fixed throw eccentric mechanism comprising a disc crank 11 on rotatable shaft 12. A connecting rod 14 is pivotally mounted at a lower end to disc 11 by a pin 15 offset from the axis of shaft 12. The latter shaft is arranged to be driven by an output element 17 of a constant displacement meter through a conventional gear train so that its rotational movement is a measure of the quantity.of gas passing through the meter. Element 17 is magnetically coupled to the meter rotor shaft which isolates the pressurized meter body on the compensated counter assembly.

For translating rotary movement of shaft 12 and disc 11 to the drive mechanism of compensated register 41 of counter assembly 40, the upper end of connecting rod 14 is pivotally connected by pin 16 to a driving arm 30 mounted on an idler bearing 31 on counter shaft 240 to oscillate accurately about shaft 240. A driven arm 32 having an adjustable engaging surface 33 pivoted at one end about shaft 240 has a spring 34 forcing opposite end 38 of arm 32 against a cam 35 driving one portion of the cycle. Driving arm 30 includes an L-shaped surface 36 engaging surface 33 of driven arm 32 during a portion of the cycle. In order to actuate compensating register 41, driven arm 32 carries a suitable overriding one-way clutch 37 which is drivably associated with counter shaft 240.

In operation of the apparatus, fluid temperature is sensed by a bimetallic temperature sensing probe 80 inserted in the metered fluid. Rotation of the probe is caused by temperature variations that cause rotation of cam 35 about cam shaft 81. Driving arm 30 is caused to oscillate in a first arc about the idler bearing 31. The arc of oscillation of driven arm 32 however, is less than that of driving arm 30 with the reduced second arc being limited in one direction by the angle of cam 35 and in the other direction by the limit of the arc of driving arm 30. Being that the driven arm 32 is held against cam 35 by spring 34 until L-shaped surface 36 engages surface 33, it causes the L-shaped portion 38 of driven arm 32 to be lifted from the cam. Cam 35, having an angle dependent upon the temperature of the meter fluid thereby changes the position of cam 35, and the reduced arc of the driven arm 32 is thus varied.

Referring now to FIGS. 4–8 a first embodiment of a temperature sensing unit including a sheath 20 in accordance with the invention hereoffor protecting temperature sensing probe 80 against injury. In a first embodiment, sheath 20 is removable as would be useful with variations in meter well size. Protective sheath 20 is formed in a tubular configuration for connection to a tubular connector flange 22, and includes a plurality of a parallel, elongated slots 21 through which gaseous fluid can flow in contact with spiral wound bimetallic sensor coil 24. The distal end of sensor coil 24 is spot welded at a distal end 26 of rotatable shaft 28 and the proximal end of sensor coil 24 is spot welded to the distal end 27 of connector flange 22. Rotatable shaft 28 extends through both bearings 42 assembled to opposite ends of connector flange 22.while the distal end 46 of sheath 20 in this embodiment, is fully open.

The head or inward end 48 of the compensating unit is comprised of a working cam 50, a hub 52, and a dial 54 along with a balance cam 56. Cam 56 and dial 54 are joined via riveting in a well known manner to form a dial assembly 58 that is secured together with cam 50 and hub 52 in a sandwich relation as by staking. After calibrating sensor 24, set screw 60 in hub 52 is tightened, locking head assembly 48 firmly to shaft 28. Excess material of shaft 28 is removed and the head end of shaft 28 is welded at 62 to hub 52 (FIG. 8). Reference pointer 64 is affixed to a groove (not shown) of flange 22 aligned with indicia markings thereat on dial 54.

The foregoing, absent sheath 20, is assembled and secured together after which sheath 20 is added as best seen in FIG. 7 to afford protection against injury of the sensor 24 during mechanical handling. Sheath 20 is preferably comprised of stainless steel or other metal suitable for welding with a wall thickness of about 0.007–0.030 inches, and preferably is of a thickness of about 0.010 inches. A primary use of the sheath is in a field retrofit installation where the installer might inadvertently incur a misalignment in attempting to insert a new probe onto the meter thermo-well such that an injury to the sensor elements could readily occur. The removable feature of the sheath attachment is afforded by an O-ring 66 that provides a frictional fit with the sheath as best seen in FIG. 7, while affording sheath removability such as where insertion resistance is encountered as a result of manufacturing tolerances.

By means of the slots 21, contact between the metered fluid and sensor 20 is readily effected not only by natural gas but also with even more viscous media such as ethylene glycol that impinge directly against the sensor so as to improve heat transfer and subsequent cycle time during calibration testing of the unit. For this embodiment, the sheath is utilized only during installation and then removed during operation or can optionally be left in place where a suitable fit is effected.

Referring now more specifically to FIGS. 9 and 10, there is disclosed a second embodiment of sheath which is non-removable and permanent and not intended for removal subsequent to initial installation. It will be noted on comparison, that the two embodiments differ in only minor details such that in the second embodiment, sheath 20 includes a greater length while flange 22 is of a shorter length with a stub 68 to receive sheath 20 in an overfit. Upon receipt, sheath 20 is secured by a weld 70 to flange 22. Also there is included in the second embodiment a PTFE bearing 72 at an intermediate location within sheath 20, between the inward end of sensor 24 and the weld 70. Another difference is the distal end of sheath 20 in the second embodiment is spot or fully welded to a hollow end plug 74 that facilitates draining of test fluids and the like. Moreover, by virtue of the non-removable construction, bearings 72 at both ends of shaft 28 preclude sensor drooping that might otherwise occur.

By the above description there is disclosed a novel construction for protecting a temperature sensitive probe of a temperature corrected flow meter installation. With a relatively inexpensive metal sheath installed in an enveloping relation about the probe, the probe is protected against handling injuries such as are commonly encountered during manufacturing, shipment, calibration and retrofitting. While amounting to a relatively simple and inexpensive solution to a long standing problem, previous probe injuries commonly encountered during such occasions have been largely if not completely eliminated by means of the invention. The virtues thereof should be readily apparent to those skilled in the art.

Since many changes could be made in the above construction and many apparently widely different embodiments of this invention could be made without departing from the scope thereof, it is intended that all matter contained in the drawings and specification shall be interpreted as illustrative not in a limiting sense.

I claim:

1. A temperature sensing unit for sensing the temperature of fluid flowing through a meter and outputting a rotational movement to a temperature compensating unit disposed in said meter, said sensing unit comprising:
   a rotatable shaft having a distal end and a proximal end, the proximal end being connected to the temperature compensating unit in said meter, wherein said rotatable shaft provides a rotational movement to said compensating unit;
   a connector flange having a proximal end disposed proximal to the temperature compensating unit, said connector flange having an opening therethrough for passage of said rotatable shaft,
   a temperature sensor probe comprised of a predetermined length of bimetallic coil displaceable in response to temperature changes in the fluid flowing through the meter, said bimetallic coil being disposed around said rotatable shaft, said coil further having a distal end fixably connected to the distal end of said rotatable shaft and a proximal end fixably connected to said connector flange, wherein the connector flange is disposed between the temperature compensating unit and the temperature sensor probe, said coil also having an interior side proximal to said rotatable shaft and an exterior side disposed away from said shaft; and wherein the temperature sensing unit further comprises
   an elongated tubular sheath disposed around the exterior side of said sensor probe, said sheath having a proximal end contacting said connector flange.

2. The temperature sensing unit according to claim 1 in which said sheath includes perforations to allow fluid flow within said sheath in direct contact with said probe.

3. The temperature sensing unit according to claim 2 in which said perforations comprise a plurality of elongated slots within the exterior of said sheath.

4. The temperature sensing unit according to claim 2 in which said sheath is comprised of a weldable metal composition.

5. The temperature sensing unit according to claim 4 in which said sheath has a wall thickness of about 0.007 inches–0.030 inches.

6. The temperature sensing unit according to claim 4 in which said weldable metal comprises stainless steel.

7. The temperature sensing unit according to claim 5 in which said sheath is removable and the distal end of the sheath extends from beyond the distal end of the probe to a proximal end of the sheath contacting the tubular flange.

8. The temperature sensing unit according to claim 7 further including an annular gasket disposed circularly around a tubular portion of said connector flange and in contact with the proximal end of said sheath.

9. The temperature sensing unit according to claim 5 in which said sheath includes a bearing located within said sheath and surrounding said shaft.

10. A temperature sensing unit for sensing the temperature of fluid flowing through a meter and outputting a rotational movement to a temperature compensating unit disposed in said meter, said sensing unit comprising:
    a rotatable shaft having a distal end and a proximal end, the proximal end being connected to the temperature compensating unit in said meter, wherein said rotatable shaft provides a rotational movement to said compensating unit;
    a connector flange having a proximal end disposed proximal to the temperature compensating unit, said connector flange having an opening therethrough for passage of said rotatable shaft;
    a temperature sensor probe comprised of a predetermined length of bimetallic coil displaceable in response to temperature changes in the fluid flowing through the meter, said bimetallic coil being disposed around said rotatable shaft, said coil further having a distal end fixably connected to the distal end of said rotatable shaft and a proximal end fixably connected to said connector flange, wherein the connector flange is disposed between the compensating unit and the temperature sensor probe, said coil also having an interior side proximal to said rotatable shaft and an exterior side disposed away from said shaft; and wherein the temperature sensing unit further comprises
    an elongated tubular sheath disposed around the exterior side of said sensor probe, said sheath having a proximal end contacting said connector flange, wherein the proximal end of the sheath secured against removal so as to render said sheath substantially non-removable.

11. A temperature sensing unit for sensing the temperature of fluid flowing through a meter and outputting a rotational movement to a temperature compensating unit disposed in said meter, said sensing unit comprising:
    a rotatable shaft having a distal end and a proximal end, the proximal end being connected to the temperature compensating unit in said meter, wherein said rotatable shaft provides a rotational movement to said compensating unit;
    a connector flange having a proximal end disposed proximal to the temperature compensating unit, said connector flange having an opening therethrough for passage of said rotatable shaft;
    a temperature sensor probe comprised of a predetermined length of bimetallic coil displaceable in response to temperature changes in the fluid flowing through the meter, said bimetallic coil being disposed around said rotatable shaft, said coil further having a distal end fixably connected to the distal end of said rotatable shaft and a proximal end fixably connected to said connector flange, wherein the connector flange is disposed between the compensating and the temperature sensor probe, said coil also having an interior side proximal to said rotatable shaft and an exterior side disposed away from said shaft; and wherein the temperature sensing unit further comprises
    an elongated tubular sheath disposed around the exterior side of said sensor probe, said sheath having a proximal end contacting said connector flange; and
    a bearing located in the sheath supporting the shaft.

12. The temperature sensing unit in accordance with claim 11 in which the distal end of the sheath includes an end plug.

13. A temperature sensing unit for sensing temperature of fluid flowing through a meter and outputting a rotational movement to a temperature compensating unit disposed in the meter, the sensing unit comprising:
    a temperature sensor probe comprising:
       a coil displaceable in response to temperature changes in the fluid flowing through the meter, wherein the coil comprises:
          a distal end, and
          a proximal end fixed relative the temperature compensating unit; and wherein the sensing unit further comprises:
  a rotatable shaft disposed in the coil and comprising:
    a proximal end connected to the temperature compensating unit, and
    a distal end secured to the distal end of the coil, wherein displacement of the coil rotates the rotatable shaft, whereby the rotatable shaft imparts rotational movement to the compensating unit.

14. A temperature sensing unit for sensing temperature of fluid flowing through a meter and outputting a rotational movement to a temperature compensating unit disposed in the meter, the sensing unit comprising:
  a temperature sensing probe comprising a coil displaceable in response to temperature changes in the fluid flowing through the meter, the coil comprising a distal end;
  a shaft disposed in the coil, the shaft comprising a distal end fixedly secured to the distal end of the coil, and
  means for imparting rotational movement to the compensating unit as the coil displaces.

* * * * *

UNITED STATES PATENT AND TRADEMARK OFFICE
CERTIFICATE OF CORRECTION

PATENT NO. : 6,523,427 B1  Page 1 of 1
DATED : February 25, 2003
INVENTOR(S) : Walter J. Ferguson It is certified that error appears in the above-identified patent and that said Letters Patent is hereby corrected as shown below:

Column 1,
Line 51, delete "probe," and insert -- probe --

Column 2,
Line 24, insert -- it -- after "which"

Column 3,
Line 17, delete "quantity.of" and insert -- quantity of --
Line 52, delete "hereoffor" and insert -- hereof for --
Line 64, delete "22.while" and insert -- 22 while --

Column 4,
Line 27, delete "20" and insert -- 24 --

Signed and Sealed this

Second Day of December, 2003

JAMES E. ROGAN
*Director of the United States Patent and Trademark Office*